(12) United States Patent
Froehlich

(10) Patent No.: US 8,567,061 B2
(45) Date of Patent: Oct. 29, 2013

(54) COMBUSTION CHAMBER COMPRISING A COOLING UNIT AND METHOD FOR PRODUCING SAID COMBUSTION CHAMBER

(75) Inventor: Anton Froehlich, Feldkirchen-Westerham (DE)

(73) Assignee: EADS Space Transportation GmbH, Bremen (DE)

( * ) Notice: Subject to any disclaimer, the term of this patent is extended or adjusted under 35 U.S.C. 154(b) by 1086 days.

(21) Appl. No.: 12/555,661

(22) Filed: Sep. 8, 2009

(65) Prior Publication Data

US 2010/0229389 A1 Sep. 16, 2010

Related U.S. Application Data

(62) Division of application No. 10/571,850, filed as application No. PCT/EP2004/010097 on Sep. 10, 2004, now Pat. No. 7,603,843.

(30) Foreign Application Priority Data

Sep. 19, 2003 (DE) .................................. 10343049

(51) Int. Cl.
*B21K 3/00* (2006.01)

(52) U.S. Cl.
USPC ................... 29/890.01; 29/888.01; 29/889.2; 60/267; 165/169

(58) Field of Classification Search
USPC ............ 29/890.01, 888.01; 60/257, 260, 266, 60/267; 165/169
See application file for complete search history.

(56) References Cited

U.S. PATENT DOCUMENTS

| 3,043,103 | A | | 7/1962 | Dent et al. | |
|---|---|---|---|---|---|
| 3,595,025 | A | | 7/1971 | Stockel et al. | |
| 3,798,902 | A | * | 3/1974 | Butter | 60/260 |
| 3,910,039 | A | * | 10/1975 | Fortini | 60/265 |
| 4,431,488 | A | | 2/1984 | Hemmerich et al. | |
| 4,762,462 | A | | 8/1988 | Lardellier | |
| 4,781,019 | A | | 11/1988 | Wagner | |
| 5,263,820 | A | * | 11/1993 | Tubbs | 416/97 R |
| 5,287,891 | A | | 2/1994 | Bourlon | |
| 5,738,493 | A | | 4/1998 | Lee et al. | |

(Continued)

FOREIGN PATENT DOCUMENTS

| DE | 1197689 B | 7/1965 |
|---|---|---|
| DE | 4137638 A1 | 6/1993 |

(Continued)

OTHER PUBLICATIONS

International Search Report for PCT/EP2004/010097 mailed on Dec. 2, 2004.

*Primary Examiner* — Alexander P Taousakis
(74) *Attorney, Agent, or Firm* — Leydig, Voit & Mayer, Ltd.

(57) ABSTRACT

A method for producing a combustion chamber includes providing a combustion chamber wall; forming a plurality of milled recesses in the combustion chamber wall, along a longitudinal axis and in an area of the longitudinal axis transverse to the longitudinal axis; and forming a cooling channel having a substantially rectangular cross section and opposite web walls inside the combustion chamber wall along the longitudinal axis and configured to receive a flow a cooling medium along the longitudinal axis, wherein the plurality of milled recesses form depressions in the web walls.

14 Claims, 2 Drawing Sheets

(56) References Cited

U.S. PATENT DOCUMENTS

| | | | |
|---|---|---|---|
| 5,765,360 A * | 6/1998 | Schmidt et al. | 60/204 |
| 6,098,397 A | 8/2000 | Glezer et al. | |
| 6,142,734 A | 11/2000 | Lee | |
| 6,151,887 A * | 11/2000 | Haidn et al. | 60/257 |
| 6,516,872 B1 * | 2/2003 | Cornu et al. | 165/133 |
| 6,589,600 B1 | 7/2003 | Hasz et al. | |
| 6,640,538 B1 * | 11/2003 | Preclik et al. | 60/266 |
| 7,188,417 B2 * | 3/2007 | Weeks | 29/890.01 |
| 7,334,333 B2 * | 2/2008 | Palazzini et al. | 29/889.721 |
| 7,368,980 B2 | 5/2008 | Benelbar et al. | |
| 7,458,780 B2 * | 12/2008 | Weisse et al. | 416/233 |
| 7,481,784 B2 * | 1/2009 | Haggander | 60/257 |
| 8,002,168 B2 * | 8/2011 | Boman | 228/165 |
| 2002/0092291 A1 | 7/2002 | Bichler et al. | |
| 2004/0139721 A1 * | 7/2004 | Haggander et al. | 60/39.15 |
| 2010/0058586 A1 * | 3/2010 | Lundgren et al. | 29/890.01 |
| 2011/0192137 A1 * | 8/2011 | Maeding | 60/267 |

FOREIGN PATENT DOCUMENTS

| | | |
|---|---|---|
| DE | 10054333 A1 | 5/2002 |
| DE | 10156124 A1 | 6/2003 |
| DE | 10248548 A1 | 4/2004 |
| DE | 69723663 T2 | 4/2004 |
| GB | 1410014 A | 10/1975 |
| JP | 1003474 A | 1/1989 |
| JP | 2002517673 A | 6/2002 |
| JP | 2004518061 A1 | 6/2004 |
| WO | WO 9964791 A1 | 12/1999 |
| WO | 02055864 A1 | 7/2002 |
| WO | WO 02055863 A1 | 7/2002 |
| WO | WO 02055864 A1 | 7/2002 |
| WO | WO 03052255 A1 | 6/2003 |

* cited by examiner

COMBUSTION CHAMBER COMPRISING A COOLING UNIT AND METHOD FOR PRODUCING SAID COMBUSTION CHAMBER

This application is a divisional of U.S. patent application Ser. No. 10/571,850, filed on Mar. 15, 2006, now U.S. Pat. No. 7,603,843, which is the U.S. National Phase of International Patent Application Serial No. PCT/EP2004/010097, filed on Sep. 10, 2004, which claims the benefit of German Patent Application Serial No. 10343049.0, filed on Sep. 16, 2003, all of which are incorporated by reference herein.

The present invention relates to a combustion chamber for a rocket engine, which is used to expel a hot gas stream, said combustion chamber having cooling channels through which a cooling medium flows. The invention also relates to a method for producing such a combustion chamber.

BACKGROUND

The cooling channels that are adjacent to a combustion chamber wall normally have the objective of keeping the combustion chamber wall so cool relative to the hot combustion gases that a sufficiently long service life of the combustion chamber is ensured. Various solutions are known from the state of the art for achieving this objective.

German patent application DE 100 54 333 A1 discloses a combustion chamber with a cooling unit as well as with an inner combustion chamber wall adjacent to the interior of the combustion chamber for a regeneratively cooled engine. The inner combustion chamber wall has depressions that are configured in such a way that a stable gas stream formed in the area of the inner combustion chamber wall during operation of the combustion chamber becomes destabilized in terms of its flow in the area of the depressions. This approach is based on the consideration that the gas stream in the combustion chamber forms a boundary layer in the area of the combustion chamber wall in the normal case of a smooth combustion chamber wall, said boundary layer having a certain thermal insulating effect against the heat input into the combustion chamber wall resulting from the hot gas stream. With that arrangement, an endeavor is made to disrupt the formation of this thermally insulating boundary layer so as to increase the heat input into the combustion chamber wall and thus into the cooling unit. However, from the standpoint of manufacturing, creating depressions inside the combustion chamber is technically difficult and expensive.

Furthermore, German patent application DE 101 56 124 A1 discloses a rocket engine with a combustion chamber and an expanding nozzle, said combustion chamber and/or said expanding nozzle having cooling channels for cooling with a liquid. In order to reduce temperature layering (stratification) in the cooling medium, it is provided that at least some of the cooling channels have a meander-like geometry, at least in sections. As a result of a curvature of the cooling channel, centrifugal forces and Coriolis forces are induced by the resultant flow deflection as a function of the local curvature radius, said forces manifesting themselves in the formation of a vortex pair situated in the flow cross section. This vortex pair ensures a convective flow exchange within the cross section, as a result of which stratification is reduced. However, the production of meander-like cooling channels calls for additional effort and raises the costs.

Finally, world patent application WO 02/055864 A1 describes providing the cooling channels with a surface that guides the cooling medium. The guide surface imparts the coolant with a rotation when it flows through the cooling channel so that a stratification is prevented. In order to create the guide surface, it is provided that a metal film is shaped into the desired form with the guide surface and this intermediate product is configured as cooling channels and applied onto a combustion chamber wall. Here, the guide surface is formed by protruding ribs that are at an angle relative to the axis of the cooling channel. Instead of ribs, it is also proposed that the surface be provided with notches or grooves. These, too, extend at an angle relative to the axis of the cooling channel in order to impart the desired rotation to the cooling medium.

Hence, in order to attain an improved heat transfer from the combustion chamber into the cooling medium of a cooling unit, design measures are implemented in an attempt to prevent temperature layering in the area of the combustion chamber wall—either in the combustion chamber itself or in the cooling unit. However, the measures proposed in the state of the art have drawbacks in terms of their handling and production.

SUMMARY OF THE INVENTION

Consequently, it is an aspect of the present invention to provide a combustion chamber for a rocket engine as well as a method for its production that, in a simple manner, allows a greater heat transfer into a cooling unit.

In an embodiment, a combustion chamber for a rocket engine is provided which is used to expel a hot gas stream, said combustion chamber having cooling channels through which a cooling medium flows. According to the invention, the cooling channels have an essentially rectangular cross section, at least some of the cooling channels having depressions—which are preferably arranged on the web walls—by means of which a stratification of the cooling medium in the cooling channels is prevented. The fact that the depressions are arranged transverse to the flow direction of the cooling medium results in a reliable destabilization of the temperature layering.

The provision of cooling channels having an essentially rectangular cross section allows an especially simple production since they can be created in a combustion chamber wall from the outside of the combustion chamber. The cooling channels can be created, for example, by means of a milling tool, thus eliminating the need for arduous bending or shaping procedures. In the most favorable case, the width of a cooling channel matches the width of a milling tool so that the final shape of the cooling channels can be attained with one single machining step. The creation of the depressions in at least some of the cooling channels is likewise particularly simple since all of the work can be carried out in the same machining station in one and the same clamping step.

According to a preferred method, prior to the formation of the cooling channels in the combustion chamber wall, the depressions can be created in the area of the longitudinal axis in the form of bores or milled recesses along said longitudinal axis of the cooling channels. The bores or milled recesses in the area of the longitudinal axis are preferably created prior to the formation of the actual cooling channels.

The method according to the invention stands out vis-à-vis the techniques known from the state of the art in that the obstacles provided in the area of a cooling channel are not made after the production of the cooling channel but rather already before its production. This translates into major technical advantages from the standpoint of manufacturing since a combustion chamber according to the invention can be produced with just a few tools within a short period of time.

In one embodiment, the depressions are advantageously formed symmetrically relative to the longitudinal axis in the opposite web walls. This means that the drilling axis of a drill is positioned on the longitudinal axis of the cooling channel during the drilling. The diameter of the drill is selected so as to be larger than the width of the cooling channel. Hence, with just one bore, depressions can be created relative to the longitudinal axis on each of the opposite web walls. This accounts for an especially fast production.

In another embodiment, the depressions are arranged offset relative to the longitudinal axis on the opposite web walls. In this variant, the drilling axis of a drill is positioned laterally offset by an offset distance relative to the longitudinal axis of the cooling channel. If, at the same time, the radius of the drill is selected so as to be smaller than the distance of a web wall to the longitudinal axis plus the offset distance, this then allows an arrangement in which the cooling channel has a depression on one web wall whereas, symmetrically relative to the longitudinal axis, it does not have a depression on the opposite web wall. Thus, for instance, it is possible to first create several depressions on one web wall in a lengthwise section of the cooling channel and then to create depressions on the opposite web wall in a subsequent section.

Moreover, it is advantageous for the cross section of the depressions to be configured in the shape of a circle segment, the radius of said circle segment being greater than or equal to the depth of the depressions. In this manner, the groove effect of the depressions is diminished, which translates into an increase in the service life of the combustion chamber. In this embodiment, the circle segment can never be larger than a semicircle. A cross section in the form of a circle segment can easily be created with a drill; a cross section in the form of an ellipsoidal segment would call for a milling procedure.

By varying the density of the depressions—that is to say, especially the number of depressions per length section—the obstacle effect of the depressions on the boundary layer can be varied locally and thus the local heat transfer for each area of the combustion chamber wall can be adapted to the conditions and requirements in question. Thus, it is preferable for the cooling channels to have sections with a differing number of depressions. In particular, a combustion chamber can be considered that has an injection head that is situated at a first end and a combustion chamber neck that is situated at the end opposite from the first end and that serves as an outlet opening for the gas stream. With such combustion chambers, particularly high heat flow values occur in the area of the combustion chamber neck. In order to lower the wall temperatures, a higher number of depressions can be provided in the area upstream from the combustion chamber neck. This makes it possible to prevent a stratification of the coolant before it reaches the nozzle neck. On the other hand, a combustion chamber as described above has a relatively low heat flow in the area of the injection head since the gas stream has a lower speed and temperature in this area than further downstream. If a lower number of depressions is provided in this area of the combustion chamber wall, then the heat transfer can be adjusted so that the local wall temperature at this place can be adapted to the local temperatures in areas of the combustion chamber wall that are located further downstream. In this manner, a more uniform wall temperature is achieved over the entire length of the combustion chamber. The increase in the number of depressions in individual areas of the combustion chamber wall, i.e. in the appertaining cooling channels, can be the same or different.

Here, it is also easily possible for the depressions to have different radii along the longitudinal axis of a given cooling channel. Therefore, the circle segments formed by a bore can have different radii on the one hand and can project to different depths into a given web wall on the other hand.

The depth of the bore or milled recess in the radial direction is preferably selected so as to be smaller than or equal to the height of the web walls of the cooling channel. It is easily conceivable for the depth of a given bore or milled recess to be selected so as to be different.

BRIEF DESCRIPTION OF THE DRAWINGS

The invention, its advantages and additional benefits are explained in greater depth on the basis of the following figures. The following is shown.

DETAILED DESCRIPTION

Figure 1:
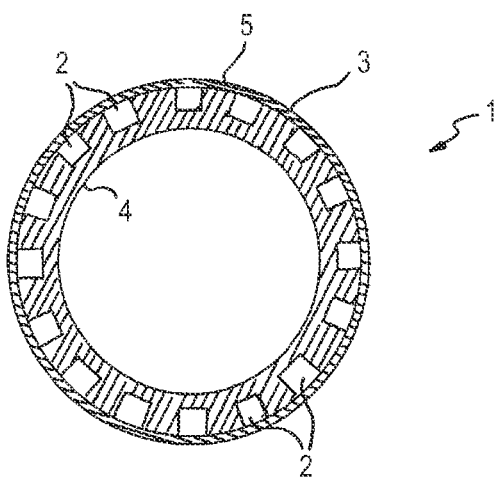
FIG. 1 a cross section of a combustion chamber for a rocket engine.
Figure 2A:
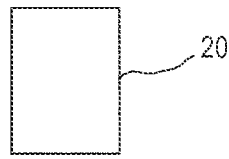
FIGS. 2a and 2b a section through a partial area of a combustion chamber showing the arrangement of the depressions relative to the cooling channels, FIGS. 3 to 5 various embodiments showing the arrangement of the depressions along a cooling channel, along the line A-A of FIG. 2.

FIG. 1 shows a combustion chamber 1 in a cross sectional depiction. A combustion chamber wall 3 is provided with a cooling unit in the form of cooling channels 2 running axially next to each other and each having a rectangular cross section. The combustion chamber wall 3 has an inner layer 4 and an outer layer 5. The cooling channels 2 are created in the combustion chamber wall 3 from the outside, for example, by means of milling using a milling tool 20, as shown in FIG. 2a. After the cooling channels 2 have been cast with wax, the outer layer 5 of the combustion chamber wall is formed by a galvanic layer, as shown in FIG. 2b. Subsequently the wax is removed again. The width of a cooling channel is, for example, between 0.7 mm and 1.3 mm.

In order to prevent temperature layering of the cooling medium that has been introduced into the cooling channels, according to the invention, obstacles in the form of depressions are provided in the web walls of the cooling channels. As can be seen more clearly from the cross sectional representation of FIGS. 2a and 2b, the depressions are only created in the area of certain web walls 10. Of course, it would certainly also be easily possible to provide obstacles on the bottom of a given cooling channel 2, but this could give rise to service life problems for the combustion chamber due to premature cracking. Therefore, an arrangement is preferred in which obstacles are only created in the web walls of certain cooling channels 2 whereas the bottom 11 remains smooth.

In FIGS. 2a and 2b, the radial depth $t_v$ of the depression matches, for instance, the depth t of the cooling channel. It would, of course, also be conceivable to configure the depth $t_v$ of the bore so that it is smaller than the depth t of the cooling channel.

Figure 2A:
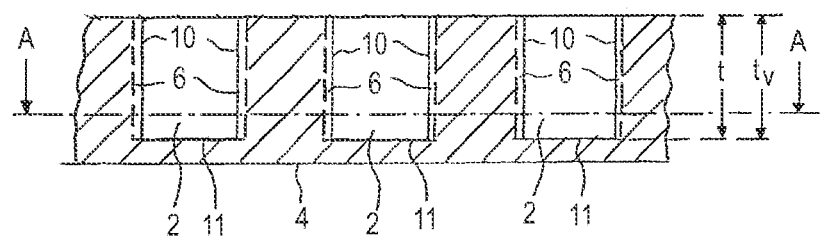
Figure 2B:
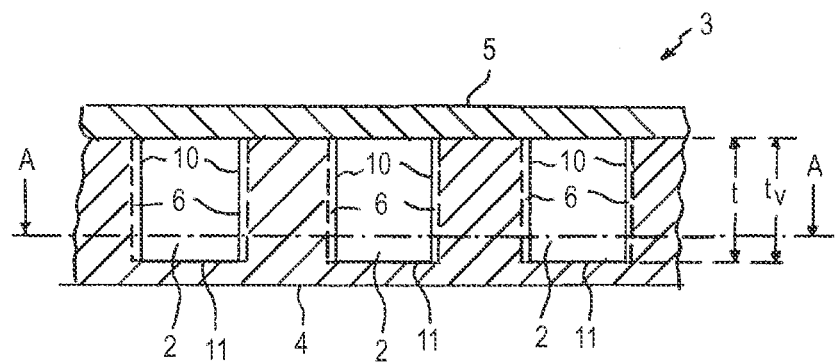
Figure 3:
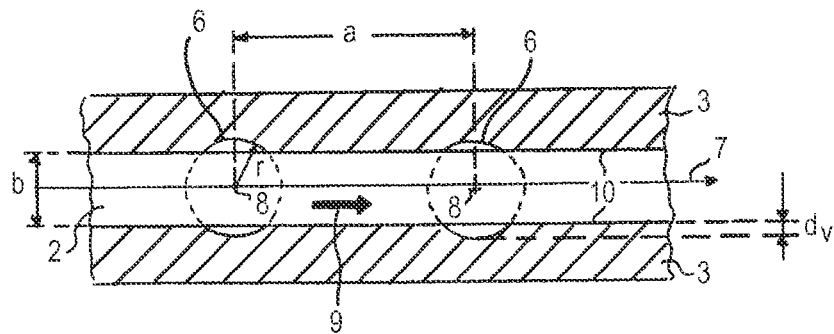
Figure 4:
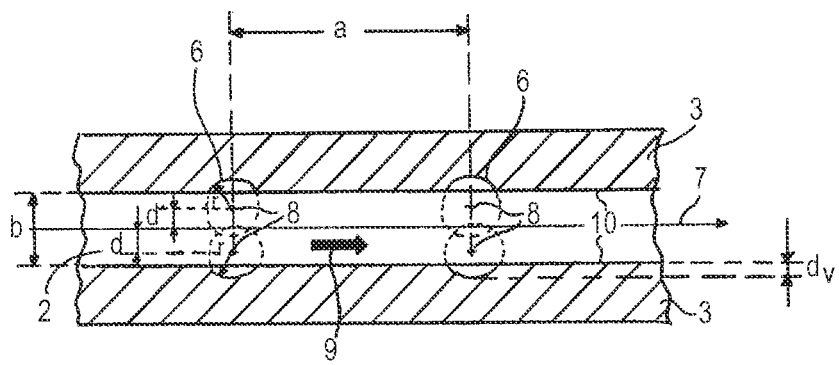
Figure 5:
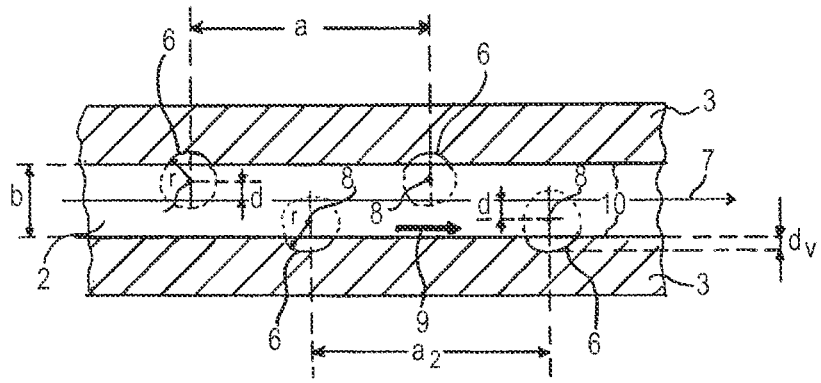

The invention is elucidated more clearly in FIGS. 3 to 5, which show a top view of a given cooling channel along the line A-A of FIG. 2 as well as the depressions created in said cooling channel. The depressions 6, which are located in the web walls 10 and which each have the cross sectional shape of a circle segment, are created in the combustion chamber wall 3 by a bore at the appropriate places in the cooling channel. Each cooling channel 2 has a longitudinal axis 7 that runs through the cooling channel essentially symmetrically relative to the web walls 10. The flow direction of the cooling medium flowing through the cooling channel 2 is indicated by the arrow having the reference numeral 9.

In the embodiment according to FIG. 3, the bore has a diameter 2r, said diameter being larger than the width b of the cooling channel 2. Two bores 6 are spaced at a distance a from each other. The distance a does not have to be uniform along the longitudinal axis 7. On the contrary, it is advantageous to reduce the distance a in areas with a high heat flow such as, for example, the combustion chamber neck, and to enlarge the distance a in areas where the heat flow is less such as, for example, in the area of the injection head.

The axial depth $d_v$ of a given depression is identical in each of the circle segments shown in FIG. 3. The depth $d_v$ of the depression, however, can vary along the longitudinal axis 7. However, in order to keep the groove effect of the depressions from becoming too large, the circle segment of a depression should not exceed a semicircle. The depth $d_v$ has to be chosen as a function of the selected cooling medium and of the flow velocity. Axial depths in the range from 0.1 mm to 0.2 mm have proven to be favorable in order to improve the heat transfer by up to 50%.

Only two bores are needed in order to create the four circle segments, that is to say, the four depressions, in the web walls 10 of the cooling channel of FIG. 3. In contrast, a total of four bores have to be made in the embodiment of FIG. 4. Whereas the drilling axis 8 of a given bore is situated on the longitudinal axis 7 in the example of FIG. 3, each drilling axis 8 in FIG. 4 is arranged offset by an offset distance d relative to the longitudinal axis 7. The radii of these bores are smaller than the previous embodiment, resulting in a greater groove effect. As far as the depth $d_v$ of the depression is concerned, like in the above-mentioned embodiment, it is sufficient if it is in the range from 0.1 mm to 0.2 mm.

Whereas the depressions are arranged symmetrically relative to the longitudinal axis 7 in the two described embodiments, the depiction in FIG. 5 shows that the depressions can also be arranged offset relative to the longitudinal axis. Whereas the bores made in the upper web wall 10 are at a distance $a_1$ from each other, the bores 6 associated with the lower web wall 10 are at a distance $a_2$. The distances $a_1$ and $a_2$ can be but do not have to be the same. For this embodiment, as well, it is characteristic that the bore axes 8 are at a distance from the longitudinal axis 7. The radius of each bore has to be dimensioned in such a way that it is less than the distance between the longitudinal axis 7 and a web wall plus the offset distance d, which is formed by the distance between the bore axis 8 and the longitudinal axis 7.

An especially simple production of the combustion chamber according to the invention is possible since the bores 6 are created before the actual production of the cooling channels of the combustion chamber wall. The production only calls for the provision of drilling and milling tools. Since no sheet metal has to be bent, the cooling channels can have a smaller width and smaller distance from each other, as a result of which the surface available for heat transfer is increased.

The distance a, $a_1$ and $a_2$ of the depressions relative to each other can be adapted to the local requirements made of the strength of the heat input into the combustion chamber wall, that is to say, the local density of the depressions can be adjusted over the distance a, $a_1$ and $a_2$. In the example according to FIG. 3, the distance is about 2 mm to 5 mm, in other words, about ten to fifty times the depth $d_v$. The density can be increased or decreased as needed, between completely smooth areas up to several dozen depressions per centimeter. As explained above, it can prove to be advantageous to provide a lower number of depressions locally in the area near the injection head as well as in the area upstream from the combustion chamber neck or else to provide depressions exclusively in these sections and otherwise to configure the cooling channels so that they are smooth.

LIST OF REFERENCE NUMERALS 1 combustion chamber
2 cooling channel
3 wall
4 inner layer
5 second/outer layer
6 depression
7 longitudinal axis
8 bore axis/mid-point
9 flow direction
10 web wall
11 bottom
12 injection head
13 combustion chamber neck
14 bore axis
b width of the cooling channel
t depth of the cooling channel
r radius of the bore
a distance between two bores
$a_1$, $a_2$ distance between two bores
$d_v$ depth of the depression
$t_v$ depth of the bore
d offset distance

What is claimed is:

1. A method for producing a combustion chamber, the method comprising:
   providing a combustion chamber wall;
   forming a cooling channel inside the combustion chamber wall, the cooling channel having a longitudinal axis and a substantially rectangular cross section with a bottom and opposite web walls, the cooling channel being configured to receive a flow of a cooling medium along the longitudinal axis; and
   forming a plurality of milled recesses in the combustion chamber wall along the longitudinal axis of the cooling channel, the milled recesses being disposed in an area of the longitudinal axis of the cooling channel and extending in a direction transverse to the longitudinal axis of the cooling channel, wherein the plurality of milled recesses form depressions in the web walls of the cooling channel.

2. The method as recited in claim 1, wherein the milled recesses are bores.

3. The method as recited in claim 1, wherein the forming of the milled recesses is performed prior to the forming of the cooling channel, the cooling channel intersecting the milled recesses.

4. The method as recited in claim 1, wherein the providing of the combustion chamber wall includes providing a first combustion chamber wall layer and subsequently forming a second combustion chamber wall layer, and wherein the forming of the milled recesses and the cooling channel is performed in the first combustion chamber wall layer.

5. The method as recited in claim 1, wherein the forming of the cooling channels is preformed using a milling tool, wherein the opposite web walls are formed equidistantly from the longitudinal axis.

6. The method as recited in claim 1, wherein the forming of the milled recesses is performed using a milling tool having a drilling axis positioned to intersect the longitudinal axis during the forming of the milled recesses.

7. The method as recited in claim 6, wherein a diameter of the milling tool is selected to be larger than a width of the cooling channel.

8. The method as recited in claim 7, wherein the milling tool is a drill.

9. The method as recited in claim 5, wherein the forming of the milled recesses is performed using a milling tool having a drilling axis positioned laterally offset by an offset distance relative to the longitudinal axis during the forming of the milled recesses.

10. The method as recited in claim 9, wherein a radius of the milling tool is selected be smaller than a distance of the web walls to the longitudinal axis plus the offset distance.

11. The method as recited in claim 9, wherein the forming of the milled recesses includes forming a first number of milled recesses on a first side of the longitudinal axis and forming a second number of milled recesses on a second side of the longitudinal axis.

12. The method as recited in claim 1, wherein the forming of the milled recesses is performed using different milling tool diameters.

13. The method as recited in claim 1, wherein a recess depth is selected to be less than or equal to a height of the web walls determined by a depth of the cooling channel.

14. The method as recited in claim 1, wherein the forming of the milled recesses includes forming a first number of milled recesses per unit length in a first channel area and forming a second number of milled recesses per unit length in a second channel area upstream from the first channel area, wherein the second number of milled recesses per unit of length is greater than the first number of milled recesses per unit length.

\* \* \* \* \*